(12) United States Patent
Sindhushayana et al.

(10) Patent No.: US 7,280,562 B2
(45) Date of Patent: Oct. 9, 2007

(54) VARIABLE PACKET LENGTHS FOR HIGH PACKET DATA RATE COMMUNICATIONS

(75) Inventors: Nagabhushana Sindhushayana, San Diego, CA (US); Rashid A. Attar, San Diego, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1145 days.

(21) Appl. No.: 10/368,887

(22) Filed: Feb. 18, 2003

(65) Prior Publication Data

US 2004/0160984 A1 Aug. 19, 2004

(51) Int. Cl.
*H04J 3/24* (2006.01)
(52) U.S. Cl. .................. 370/474; 370/349; 370/389
(58) Field of Classification Search ............... None
See application file for complete search history.

(56) References Cited

U.S. PATENT DOCUMENTS

| | | | |
|---|---|---|---|
| 2002/0012334 A1* | 1/2002 | Strawczynski et al. | 370/337 |
| 2002/0105929 A1* | 8/2002 | Chen et al. | 370/335 |
| 2003/0067899 A9* | 4/2003 | Chen et al. | 370/335 |
| 2004/0001536 A1* | 1/2004 | Lohtia et al. | 375/225 |

FOREIGN PATENT DOCUMENTS

EP    0 912 016 A2    4/1999

OTHER PUBLICATIONS

Strawczynski et al. "Multi User Frame Structure for 1XEV Forward Link," 3GPP2 cdma2000 TSG-C, Nortel Networks, 2000, pp. 1-6.

* cited by examiner

*Primary Examiner*—Bob A. Phunkulh
(74) *Attorney, Agent, or Firm*—Thomas R. Rouse; Sandra L. Godsey

(57) ABSTRACT

Method and apparatus for variable length Physical Layer (PL) packet generation. Multiple Security Layer (SL) packets may be multiplexed into a single PL packet to increase efficiency, wherein the SL packets may have variable lengths. In one embodiment, different format SL packets for different users are combined into capsules that form the PL packet. Shorter packets are for users in poor channel conditions or requiring smaller amounts of data due to the applications and the accompanying Quality of Service (QoS) requirements. In one embodiment, a modified Preamble structure provides for Unicast or multi-user packets. Alternate embodiment provides modified Rate Sets, a mechanism for identifying ACK from a single-user packet or a multiplexed packet (delayed ACK). ON/OFF keying for ACK channel v/s bi-polar keying used in IS-856, and/or multi-valued interpretation of DRC.

21 Claims, 16 Drawing Sheets

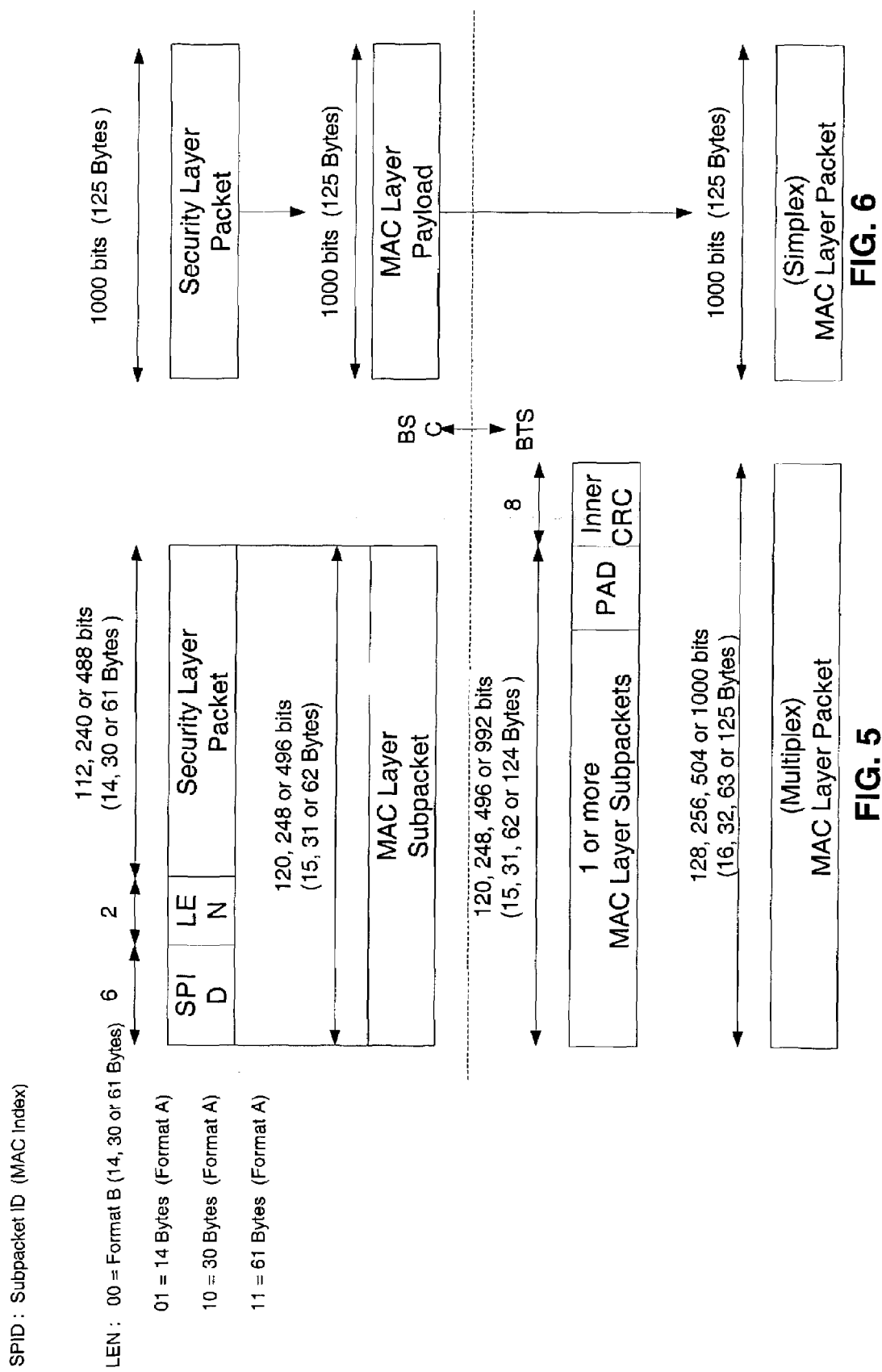

- Nominal Data Rate of New Physical Layer Packets
  - 19.2 kbps : 152 bits, 4 slots [ Max Rate: 76.8 kbps ]
  - 25.6 kbps : 280 bits, 6 slots [ Max Rate: 153.6 kbps]
  - 57.6 kbps : 528 bits, 6 slots [Max Rate: 307.2 kbps]

- Multi-valued Interpretation of DRC
  - DRC 0 : 19.2 k, 25.6 k
  - DRC 1 : 19.2 k, 25.6 k or 38.4 k (1024 bit pkt)
  - DRC 2 : 19.2 k, 25.6 k, 57.6 k or 76.8 k (1024 bit pkt)
  - DRC 3 : 19.2 k, 25.6 k or 57.6 k or 153.6 k (1024 bit pkt)
  - DRC 4 : 57.6 k or 307.2 k (1024 bit pkt)
  - DRC 5: 57.6 k or 307.2 k-L (2048 bit pkt)
  - DRC 6: 57.6 k or 614.4 k (1024 bit pkt)
  - DRC 7: 57.6 k or 614 k-L (2048 bit pkt)

FIG. 10

Compatibility between EDRI and DRC

- DRC 0, 1, 2: None
- DRC 3: 153.6 k
- DRC 4: 153.6 k, 307.2 k
- DRC 5: 153.6 k, 307.2 k-L
- DRC 6: 153.6 k, 307.2 k, 614.4 k
- DRC 7: 153.6 k, 307.2 k, 614.4 k-L
- DRC 8: 153.6 k, 307.2 k, 614.4 k-L, 921 k
- DRC 9: 153.6 k, 307.2 k, 614.4 k-S, 1.2 M-S
- DRC 10: 153.6 k, 307.2 k, 614.4 k-L, 921 k, 1.2 M-L
- DRC 11: 153.6 k, 307.2 k, 614.4 k, 1.2 M, 1.8 M
- DRC 12: 153.6 k, 307.2 k, 614.4 k, 1.2 M, 2.4 M
- DRC 13: 153.6 k, 307.2 k, 614.4 k-L, 921 k, 1.2 M-L, 1.5 M
- DRC 14: 153.6 k, 307.2 k-S, 614.4 k-S. 1.2 M-S, 2.4 M, 3 M

FIG. 11

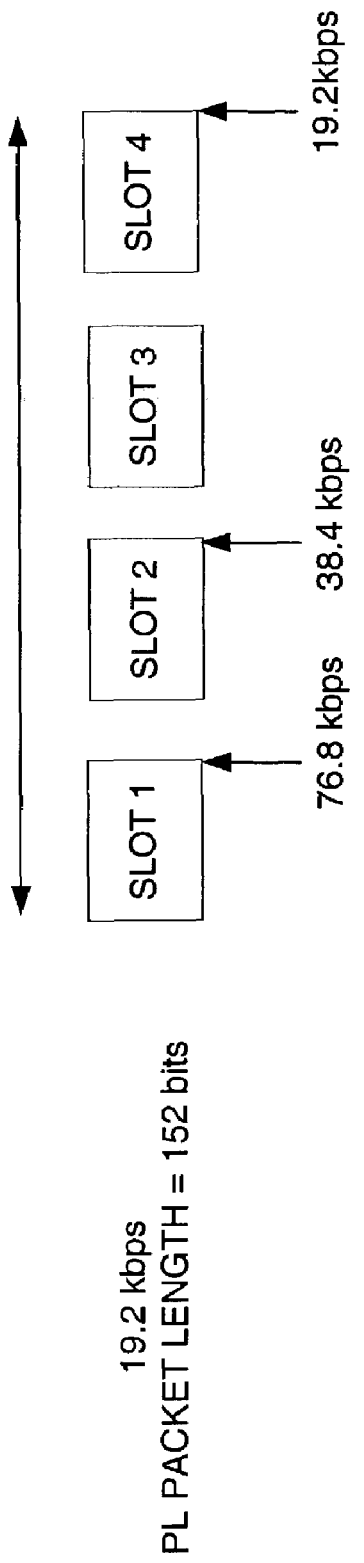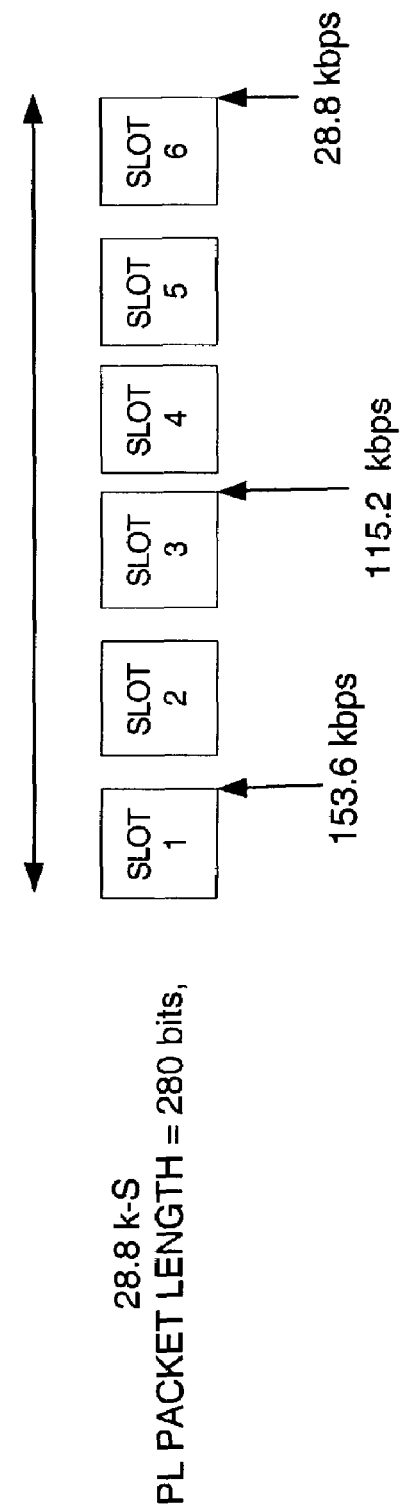

VARIABLE PACKET LENGTHS FOR HIGH PACKET DATA RATE COMMUNICATIONS

BACKGROUND

1. Field

The present invention relates generally to communication systems, and more specifically to variable packet lengths for application to a high rate packet data communications.

2. Background

High Rate Packet Data (HRPD) communications are optimized for bulk data transport. One HRPD system is detailed in the cdma2000, standard referred to as 1xEV-DO and specified in TIA/EIA IS-856 entitled "cdma2000 High Rate Packet Data Air Interface Specification." FIG. 1 illustrates the air interface layering architecture for a 1xEV-DO system. The Connection layer (CL) provides air link connection establishment and maintenance services. The Security Layer (SL) provides encryption and authentication services. The Physical Layer (PL) provides the channel structure, frequency, power output, modulation and encoding specifications for the Forward and Reverse channels. The Medium Access Control (MAC) layer defines procedures to receive and transmit over the Physical Layer. FIG. 2 illustrates the Forward channel structure, including Pilot, MAC, Control and Traffic channels.

Data is processed as illustrated in FIG. 1, wherein processing of a Connection Layer (CL) packet 102 includes first adding a security layer header 110 and tail 112 to the form a Security Layer (SL) packet 104. The SL packet 104 is then used to generate a Medium Access Control (MAC) layer packet 106, and finally a Physical Layer (PL) packet 108. The MAC layer 106 payload is a fixed number of bits. The PL 108 payload is then a multiple n times the length of the MAC layer 106 payload, plus the length of physical layer overhead (CRC tail bits etc.), wherein n is an integer.

The limitations of the fixed MAC layer 106 payload results in inefficiencies in transmission and thus wasted bandwidth. For example, when the channel condition to a given user is "good" as determined by Signal to Interference and Noise Ratio (SINR) or Data Rate Control (DRC) measure exceeding a threshold, there is a desire to transmit larger packets. For such a user, transmission of smaller blocks of data, such as voice packets, vocoder frames, etc., on the current forward link structure in IS-856 would result in wasted space in the MAC layer 106 packet. As the size of the data is much smaller than the fixed length of the MAC layer 106 packet, the remaining bits are filled with a padding. The result is inefficiency, as the MAC layer 106 packet is not fully utilized.

There is a need, therefore, for a variable packet length for HRD communications, wherein the variable length packets provide efficiency. There is further a need to combine smaller MAC layer 106 packets into a single physical layer packet, allowing data for multiple users to be transmitted per packet.

BRIEF DESCRIPTION OF THE DRAWINGS

FIGS. 5 and 6 illustrate the generation for simplex and multiplex MAC packets from security layer packets.

FIG. 10 is a table of nominal data rates and data rate request interpretations.

FIG. 11 shows the compatibility between an explicit data rate indicator and data rate request values.

FIGS. 16 and 17 illustrate transmission of multiple slots to achieve a nominal data rate and a maximum data rate.

DETAILED DESCRIPTION

The word "exemplary" is used herein to mean "serving as an example, instance, or illustration." Any embodiment described herein as "exemplary" is not necessarily to be construed as preferred or advantageous over other embodiments.

An HDR (High Data Rate) subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An Access Network (AN) transports data packets between multiple access terminals (ATs). The AN includes network equipment providing connectivity between a packet switched data network and the AT. An AN is similar to a Base Station (BS), while an AT is similar to a Mobile Station (MS).

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Figures 3, 4:
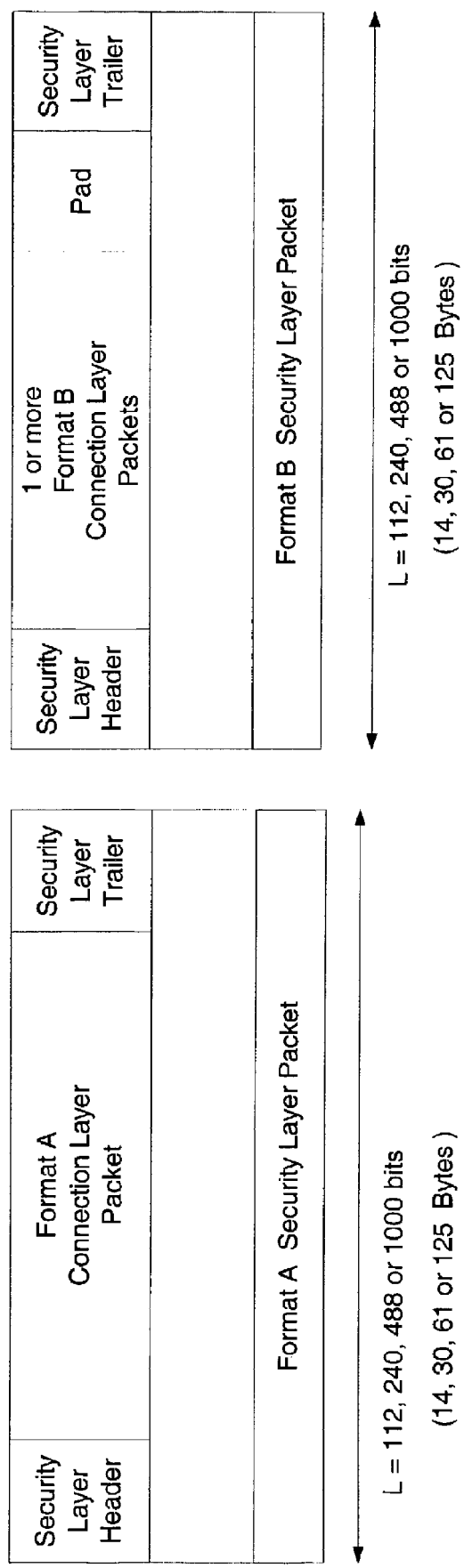
FIG. 3 is a security layer structure for a Format A connection layer packet.
FIG. 4 is a security layer structure for a Format B connection layer packet.

In the following discussion, the SL packet size is given as 1000 bits. The SL packet includes an amount of overhead given as x bits. Alternate embodiments may provide an alternate length for the SL packet. FIGS. 3 and 4 illustrate two formats for data referred to as Format A and Format B. Format A is defined as a SL packet having a one to one relation with the CL packet. In other words, the length of the CL packet is 1000 bits (i.e., the given size of the SL packet) minus x. In other words, the CL packet plus the SL overhead is equal to the given length of the SL packet. Format B is defined as 1) a SL packet which includes padding, or 2) a SL packet which includes multiple CL packets with or without padding.

Figure 1:
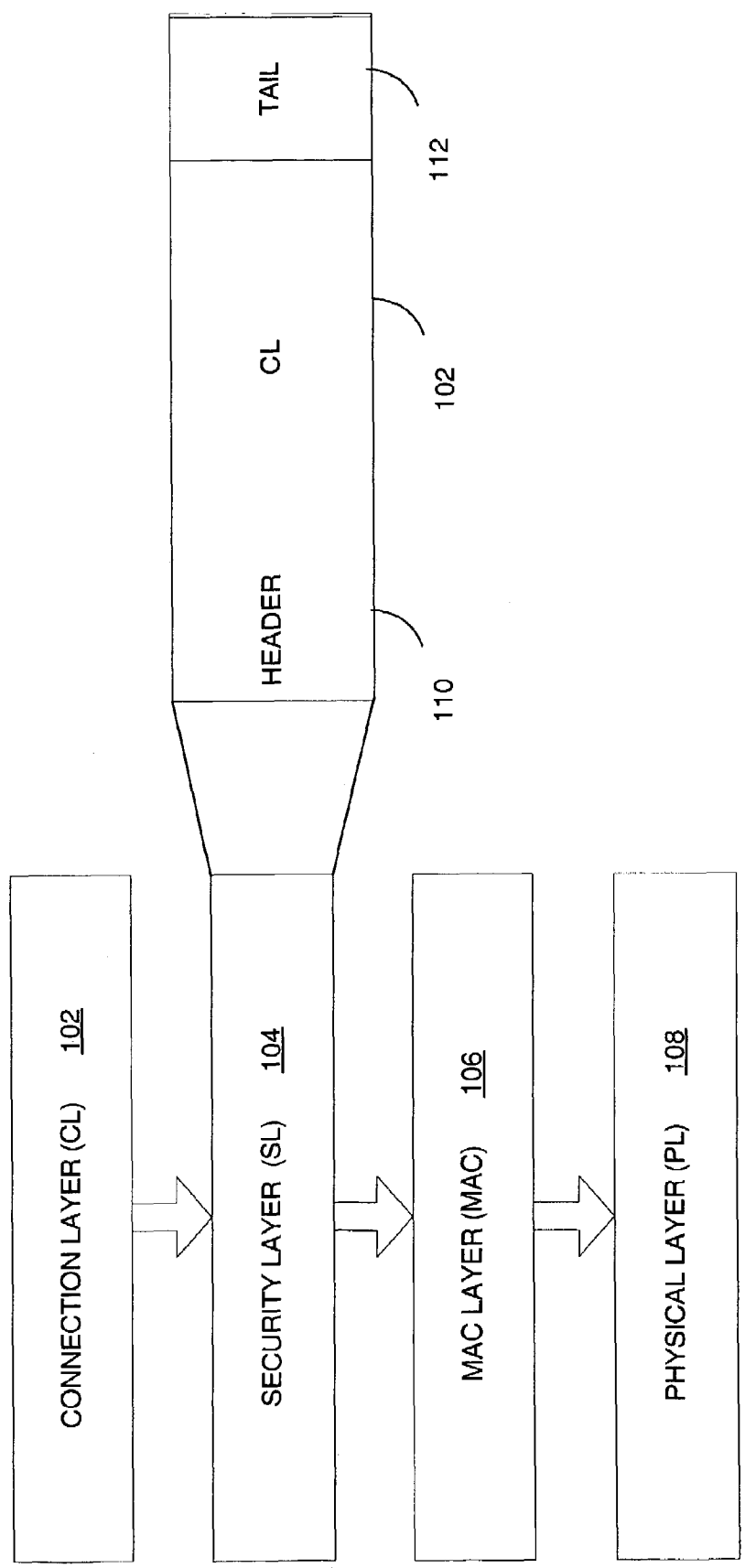
FIG. 1 is a portion of the air interface layering architecture of a High Rate Packet Data (HRPD) communication system.
Figure 2:
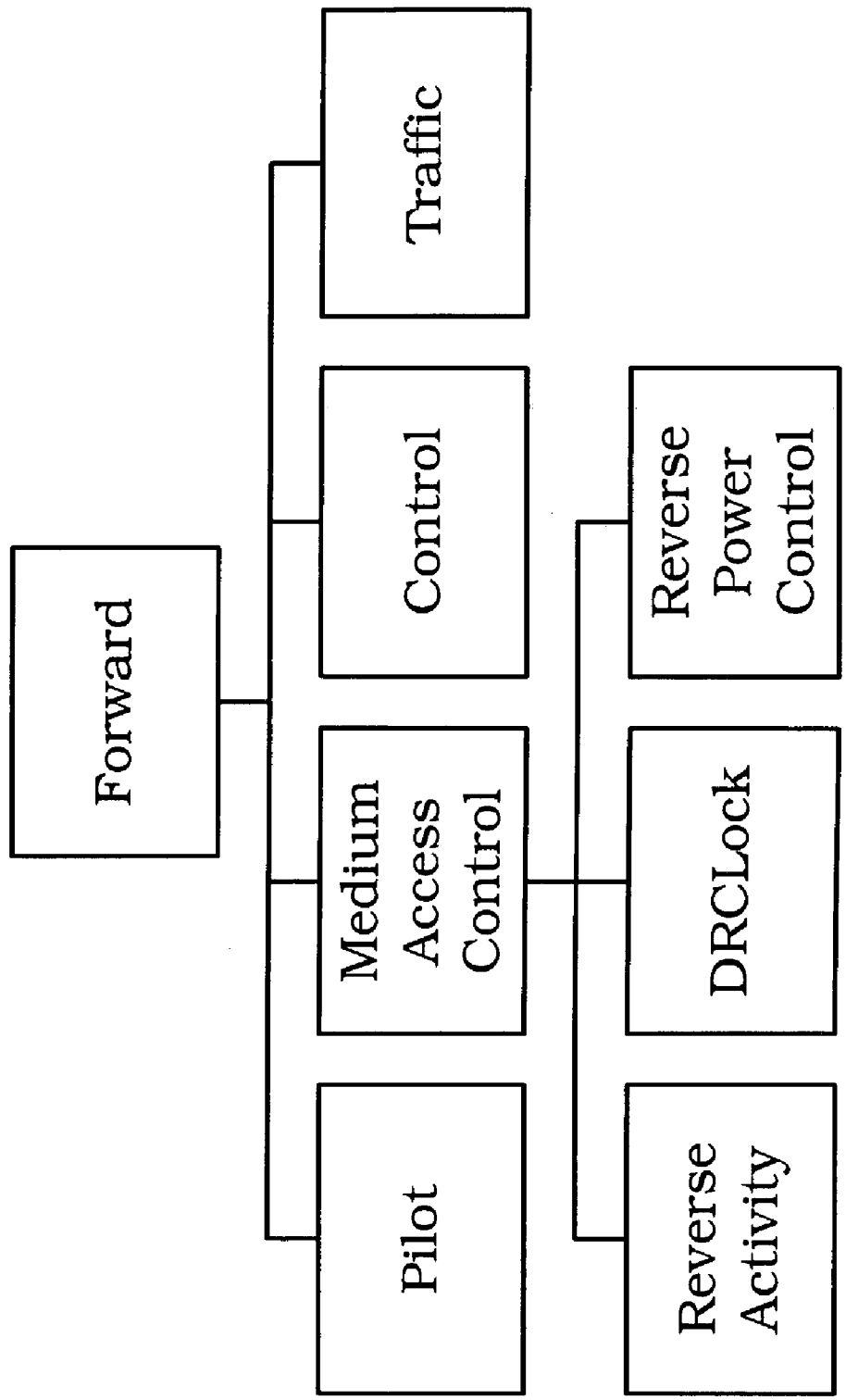
FIG. 2 is a forward channel structure for a HRPD communication system.

According to one embodiment, the size of the SL packet may be variable. FIG. 3 illustrates a Format A packet wherein the SL packet is one of four sizes. The size of the SL packet may be one of: 112, 240, 488, or 1000 bits. The SL is made up of the CL packet. There is one CL packet corresponding to one user. Data is processed as illustrated in FIG. 1, wherein processing of a Connection Layer (CL) packet 102 includes concatenating one or more Connection Layer packets, together with padding if necessary, and then adding a security layer header 110 and tail 112 to the form a Security Layer (SL) packet 104.

FIG. 4 illustrates a Format B packet wherein the SL packet is variable, and the SL payload includes one or more CL packets plus padding. The resultant SL packet size is one of 112, 240, 488, or 1000 bits.

Figure 7:
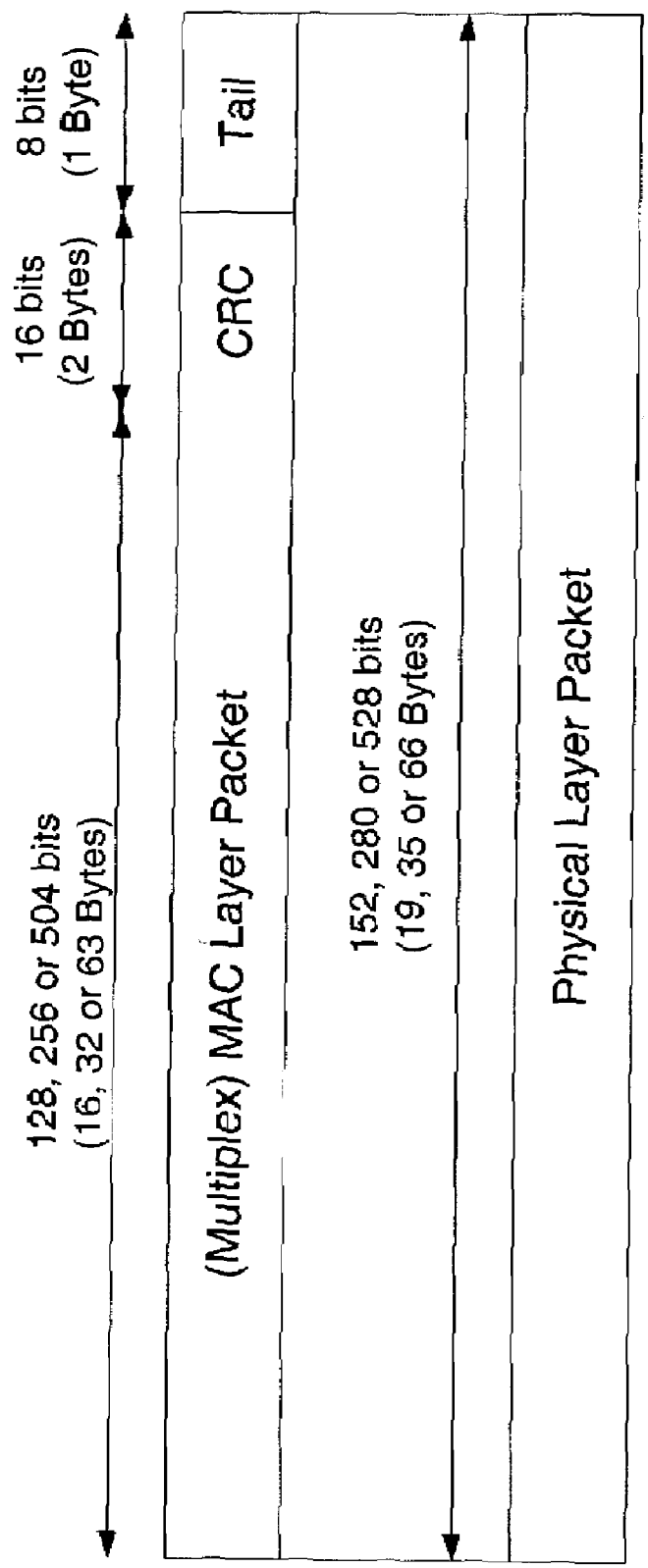
FIG. 7 is a physical layer packet structure used to carry a single MAC layer packet of length less than 1000 bits.

FIG. 5 illustrates processing of SL packets, wherein the SL packets have a length less than 1000 bits. Two fields are appended to the SL packet, a SubPacket Identification (SPID) or MAC index value, which is 6 bits long, and a LENgth indicator (LEN), which are two bits. The MAC index identifies the user to whom the packet is directed. The MAC index field is used to identify the user to whom the packet is destined. LEN specifies the format. The LEN field is used to specify whether the SL packet is of Format A or Format B. If the SL packet is of format A, the LEN also specifies the length of the SL packet, which could take on one of three values: 112, 240, 488. The resultant MAC layer subpacket is 120, 248, or 496 bits long. The MAC layer subpacket is then processed to form the MAC layer packet by determining if multiple MAC layer subpackets are to be combined. The MAC layer packet includes one or more MAC layer subpackets plus an inner Cyclic Redundancy Check value along with any necessary padding. The MAC layer packet is referred to as Multiplex if containing more than one SL packet, possibly for different users. A CRC value and a tail value are applied to the MAC layer packet to form a PL layer packet as illustrated in FIG. 7. The resultant PL packet is then 152, 280, or 528 bits long.

FIG. 6 illustrates processing of SL packets, wherein the SL packets have a length equal to 1000 bits. The MAC layer payload is the SL packet. The MAC layer packet is referred to as Simplex.

Figure 8:
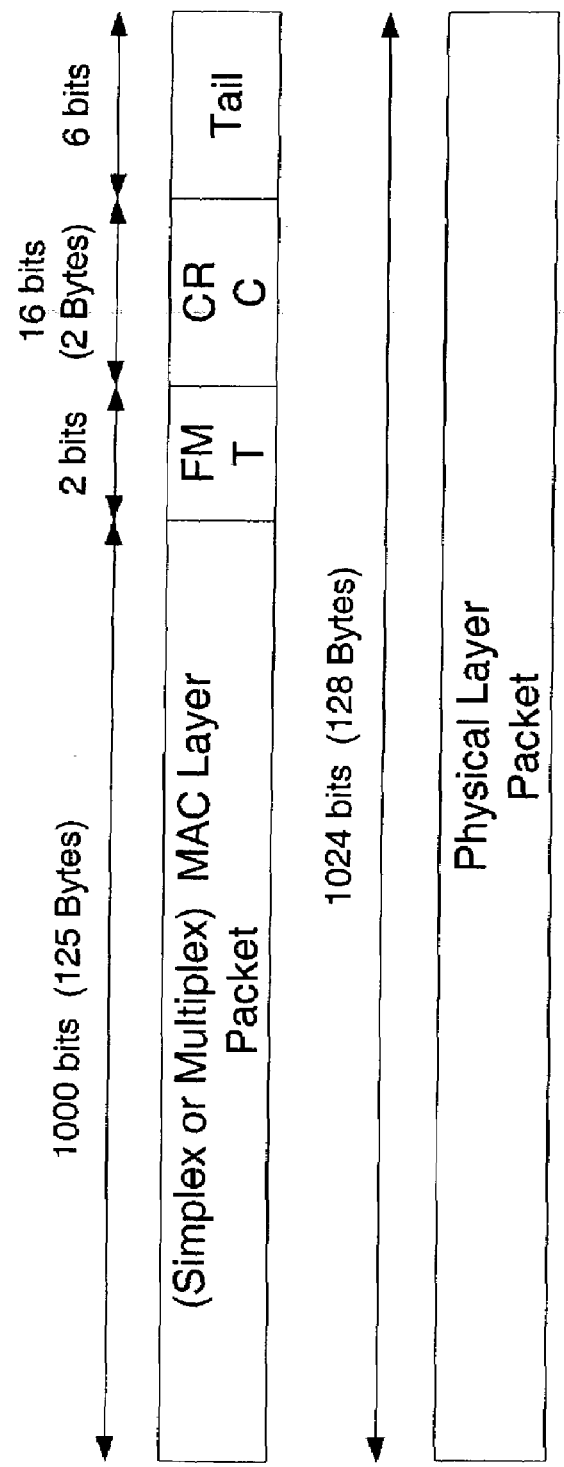
FIG. 8 is a physical layer packet structure used to carry a single MAC layer packet of length equal to 1000 bits.

FIG. 8 illustrates processing of MAC layer packets wherein the MAC layer packet has a length of 1000 bits. The processing of FIG. 8 may be used for Format A or Format B SL packets. A CRC value and a tail are applied to the MAC layer packet. Additionally, a format indicator (FMT), of 2 bits, is also applied. The significance of the FMT is given as in Table I.

TABLE I

| Format field (FMT) Definitions | | |
|---|---|---|
| 01 | = | Format A Simplex |
| 11 | = | Format B Simplex |
| 00 | = | Multiplex MAC packet |
| 10 | = | Invalid MAC packet |

Figure 15:
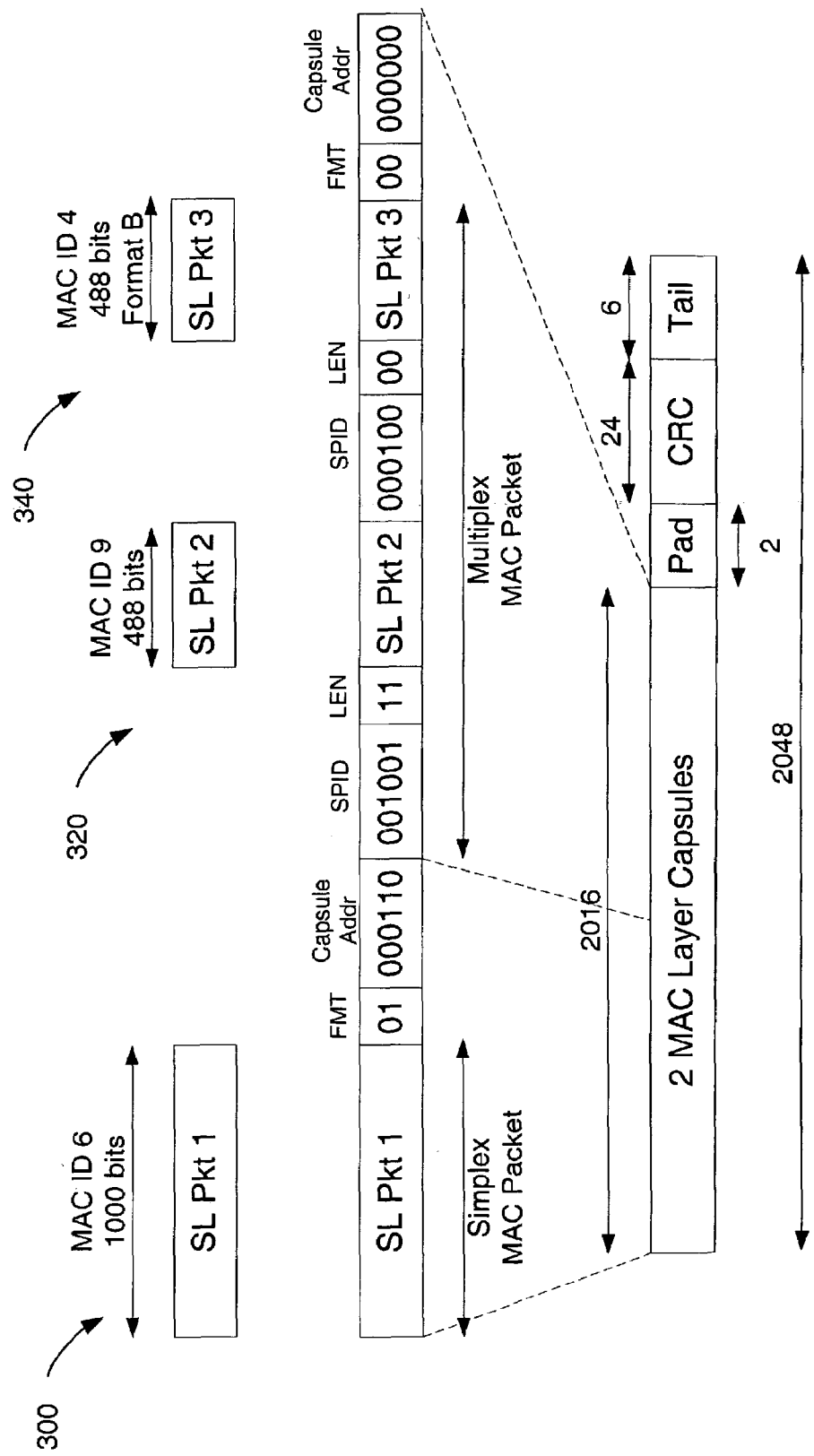
FIG. 15 is a physical layer packet including multiple medium access control layer capsules.

"Simplex" refers to a MAC packet with one SL packet; and "multiplex" implies more than one SL packet. In other words, a simplex MAC packet contains exactly one SL packet; and a multiplex MAC packet contains two or more SL packets. A capsule is defined as a MAC packet, followed by a few bits of overhead, which carry information specific to that MAC packet, e.g. FIG. 15 illustrates a single PL packet carries multiple MAC layer packets. A MAC capsule is used when a PL packet carries two or more MAC packets. The capsule is used to identify the individual capsules and is, therefore, used only in case of a multiplex packet.

Figure 9:
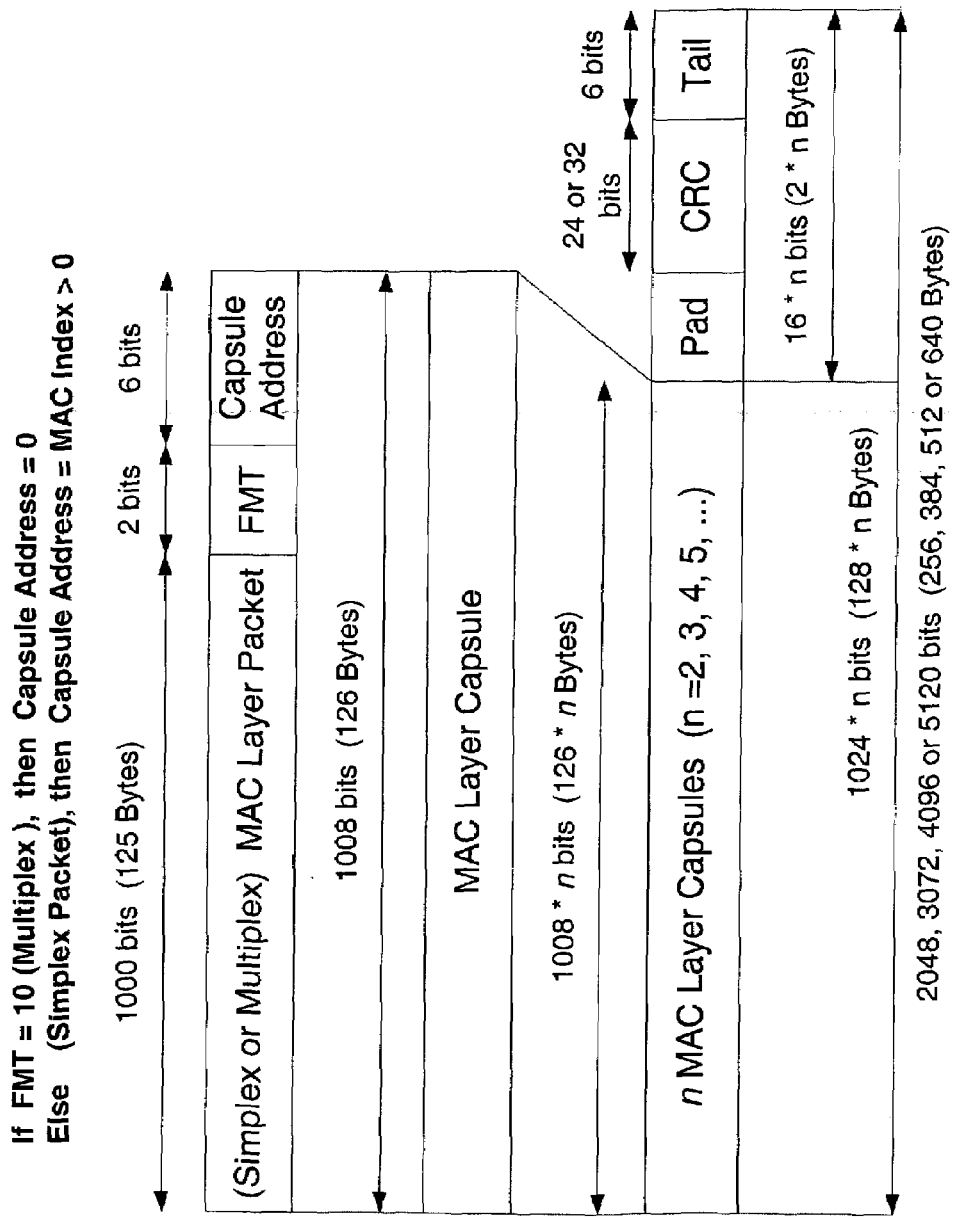
FIG. 9 is a physical layer packet structure used to carry multiple MAC layer packets of length equal to 1000 bits each.

According to one embodiment, the size of the PL packet may be increased to accommodate larger transfers. The larger PL packet also allows for multiple MAC packets to be embedded within one PL packet. Specifically, multiple MAC packets with multiple destination addresses may each be embedded in a subpacket. In this way, one PL packet is transmitted to multiple users. As illustrated in FIG. 9, a capsule is given including a MAC layer packet, the FMT and a capsule address. The interpretation of the FMT field is as specified in Table 1. The capsule address provides the destination of the MAC layer packet. Note that if the MAC layer packet is a multiplex packet, i.e., including multiple CL layer packets each having a different destination address, the capsule address may be left blank. In other words, if the PL packet will include information for multiple users, then the capsule address has little meaning, as it may only designate one user. The capsule address is 6 bits in the present example. The composite of the MAC layer packet, FMT and capsule address forms the MAC layer capsule.

Continuing with FIG. 9, multiple MAC layer capsules may be concatenated. To the combination of MAC layer capsules is added a CRC value, a tail, and any necessary padding. The padding may be included such that the MAC layer capsule overhead, i.e., pad, CRC and tail, has a length of 16*n bits. The specific length is a design choice, determined by the number of bits leftover in the PL packet after the MAC capsules and tail bits are included. Whenever there are enough bits left, it is desirable to use 32-bit CRC. In the present example the PL packet of length 2048 bits uses a 24-bit CRC, while longer PL packets use a 32-bit CRC. In the present example, there are four extended lengths for the PL packet: 2048, 3072, 4096 and 5120 bits.

FIG. 10 is a table of nominal data rates corresponding to the extended PL packets, which are recently defined with respect to HRPD in IS-856. Referring to the PL packet lengths as given in FIG. 7, a packet length of 152 bits is transmitted and incrementally retransmitted over 4 slots, for a nominal transmission data rate of 19.2 kbps. Note that according to one embodiment, calculation of data rates adopts the convention of rounding down the PL packet length to the nearest power of two. Each slot in a 1xEV-DO system is 1.666 ms long. For good channel conditions, the data rate may be increased to 76.8 kbps through the use of early termination. Early termination refers to a system wherein the receiver of the data transmits an acknowledgement or ACK when the data has been received and decoded correctly. In this way, all four attempts may not be used for transmission. Such acknowledgement terminates any further transmission of the packet. Similarly, packet lengths of 280 and 528 bits are each transmitted over 6 slots, resulting in nominal data rates of 25.6 kbps, and 57.6 kbps, respectively. Similarly, each may have a maximum data rate of 153.6 kbps, and 307.2 kbps, respectively, given early termination.

Referring to FIG. 16, for 152 bits per packet per slot having a nominal data rate of 19.2 kbps, termination after the first slot results in a maximum data rate of 76.8 kbps. Early termination after the second slot results in a maximum data rate of 38.4 kbps, or half the maximum data rate. If all four slots are transmitted, the nominal data rate of 19.2 kbps is realized.

FIG. 17 illustrates the transmission of 280 bits per packet per slot, wherein the transmission and incremental retransmission is over 6 slots. Here the nominal data rate is 25.6 kbps. Termination after the first slot results in a maximum data rate of 153.6 kbps, while termination after the third slot results in a data rate of 115.2 kbps, or half the maximum. If all 6 slots are transmitted, the nominal data rate of 25.6 kbps is realized.

In a 1xEV-DO system, the AT provides a data rate request to the AN, wherein the data rate request is transmitted on the Reverse Link (RL), and specifically on a Data Request Channel (DRC). The data rate request may be calculated as a function of the received signal quality at the AT. The AT determines a maximum data rate at which the AT may receive data. The maximum data rate is then requested by the AT for data transmissions from the AN. The data rate request is received by the AN, which then selects a packet size accordingly. For a given data rate request, the AN may generate a shorter PL packet, a conventional PL packet, or a longer PL packet. Each data rate request corresponds to one or more packet sizes. This choice depends on the QoS for the flow in question.

For example, as given in FIG. 10, for a data rate request of 19.2 kbps, referred to as "DRC0," the AN may transmit a simplex PL packet of length 152 bits to effect the 19.2 kbps or may transmit a PL packet of length 280 bits for an, effective data rate of 25.6 kbps. While the AT has knowledge of the possible PL packet sizes and data rates, the AT does not have specific knowledge as to which one is currently being used. In one embodiment, the AT tries each potential PL packet size. Note that smaller packet lengths tend to reduce loss as less information is retransmitted if not correctly received. Similarly, there is a better chance of decoding at lower data rates. In addition, the time taken to transmit the shorter packets (in case of no early termination) is a fraction of that required for longer packets given identical channel conditions.

Multi-valued data rate requests are sent via the DRC data rate request, wherein the correspondence is given in Table II. The designation "(L)" indicates an extended PL packet length. The data rate values 19.2 kbps, 28.2 kbps, and 57.6 kbps, each refer to the bit length as given in FIG. 10, respectively. For example, DRC0 corresponds to 19.2 kbps and 25.6 kbps. For data transmissions having a nominal data rate of 19.2 kbps, the PL packet contains 152 bits and is transmitted over 4 slots. For data transmissions having a nominal data rate of 25.6 kbps, the PL packet contains 280 bits and is transmitted over 6 slots. When a full length, or extended length packet is used, the indicator (L) is included in the table entry. For example, DRC5 corresponds to 307.2 kbps, wherein the PL packet length is 2048 bits. Similarly, DRC7 corresponds to 614 kbps, wherein the PL packet length is 2048 bits.

TABLE II

| DRC data rate request | rate (kbps) | rate (kbps) | rate (kbps) | rate (kbps) |
|---|---|---|---|---|
| DRC0 | 19.2 | 25.6 | — | — |
| DRC1 | 19.2 | 25.6 | 25.6 (L) | — |
| DRC2 | 19.2 | 25.6 | 57.6 | 76.8 |
| DRC3 | 19.2 | 25.6 | 57.6 | 153.6 |
| DRC4 | 25.6 | 57.6 | 307.2 | — |
| DRC5 | 25.6 | 57.6 | 307.2 (L) | — |
| DRC6 | 57.6 | 614.4 | — | — |
| DRC7 | 57.6 | 614 (L) | — | — |

Generally, packet division multiplexing is available when a DRC data rate request indicates a data rate greater than or equal to 153 kbps, or another predetermined value. For multiplexing, a single PL packet of 1024 bits or more is composed of one or more MAC layer capsule(s). Each capsule then contains MAC layer packets to one or more users. In one HRPD system, each access probe enables a pilot (I-channel), which functions as a preamble. According to one embodiment, a modified preamble includes an Explicit Data Rate Indicator (EDRI). The encoder packets support multiplex of data into one packet. At higher data rates, the preamble includes an EDRI field on the modulation phase Q branch. The EDRI is (8,4,4) bi-orthogonal coded and block repeated 8 times. The EDRI specifies one of a plurality of rates. To check if a packet is for a given user, the user will check the MAC layer identifiers. For a single user packet, the preamble transmits the MAC index on the I-branch. The MAC index (assigned to a given terminal by the AN) is a 6-bit number used by the AN to Walsh cover the packet (with the corresponding 64-ary Walsh cover) to aid the AT in identifying packets directed to thereto. This mechanism is used for a unicast packet. For multi-user packets, the preamble transmits the EDRI on the Q-branch, wherein all users with DRC compatible with EDRI attempt to decode the packet.

Potential data rates and corresponding EDRI Length (in chips) are given as: 153.6 k (256), 307.2 k-L (256), 307.2 k(128), 614 k-L (128), 921k (128), 1.2 M-L (128), 614 k (64), 1.2 M (64), 1.5 M (128), 1.8 M (64), 2.4 M (64), 3.0 M (64), and are further illustrated in FIG. 11. FIG. 11 lists the set of data rates that are compatible with each DRC. A data rate is said to be compatible with a DRC, if the packet corresponding to that data rate may be reliably decoded by any user capable of decoding (reliably) a packet with that DRC. Generally, the data rate compatible with a DRC is at most equal to that of a packet associated with the given DRC, and the duration of the packet is at least as long as that of a packet associated with the given DRC. In other words, if the user can decode a packet for that DRC it can decode a packet with all the data rates that are compatible with that DRC.

For multiplexed packets, and specifically for multi-user packets, an ACKnowledgement (ACK) indicator is provided for MAC layer retransmission, referred to as D-ARQ. The ACK is transmitted on the Reverse Link by those users able to decode the PL packet, wherein the packet contains a MAC layer packet or subpacket addressed thereto. The ACK transmission is boosted by 3dB to allow for On-Off keying. The ACK is indicated by the presence of a signal and the NACK by the absence of the signal. In bi-polar keying, ACK and NAK are indicated by transmitted different signals, of equal strength and opposite sign relative to each other. In contrast, with on-off keying, one of the messages (ACK) is indicated by transmitting a non-trivial signal, while the other message (NAK) is indicated by transmitting no signal. ON-OFF signaling is used for ARQ of multi-user packets, while bipolar signaling is used for ARQ of single-user packets. For single user packets, i.e., unicast transmission, the ACK is transmitted two slots after transmission of the packet, i.e., in the third time-slot. This is done so as to allow time for demodulation and decoding of the packet by the AT. For multi-user packets, the ACK is transmitted at a time slot, which is delayed by 4 slots from that of the single user packet. When a multi-user packet is directed to a first AT, and the AN does not receive an ACK from that AT, the AN will not send a unicast packet to that AT during the next slot on the same interlace offset. This is to disambiguate the meaning of the ACK that is sent on the 7th slot after the transmission of the multi-user packet.

Figure 12:
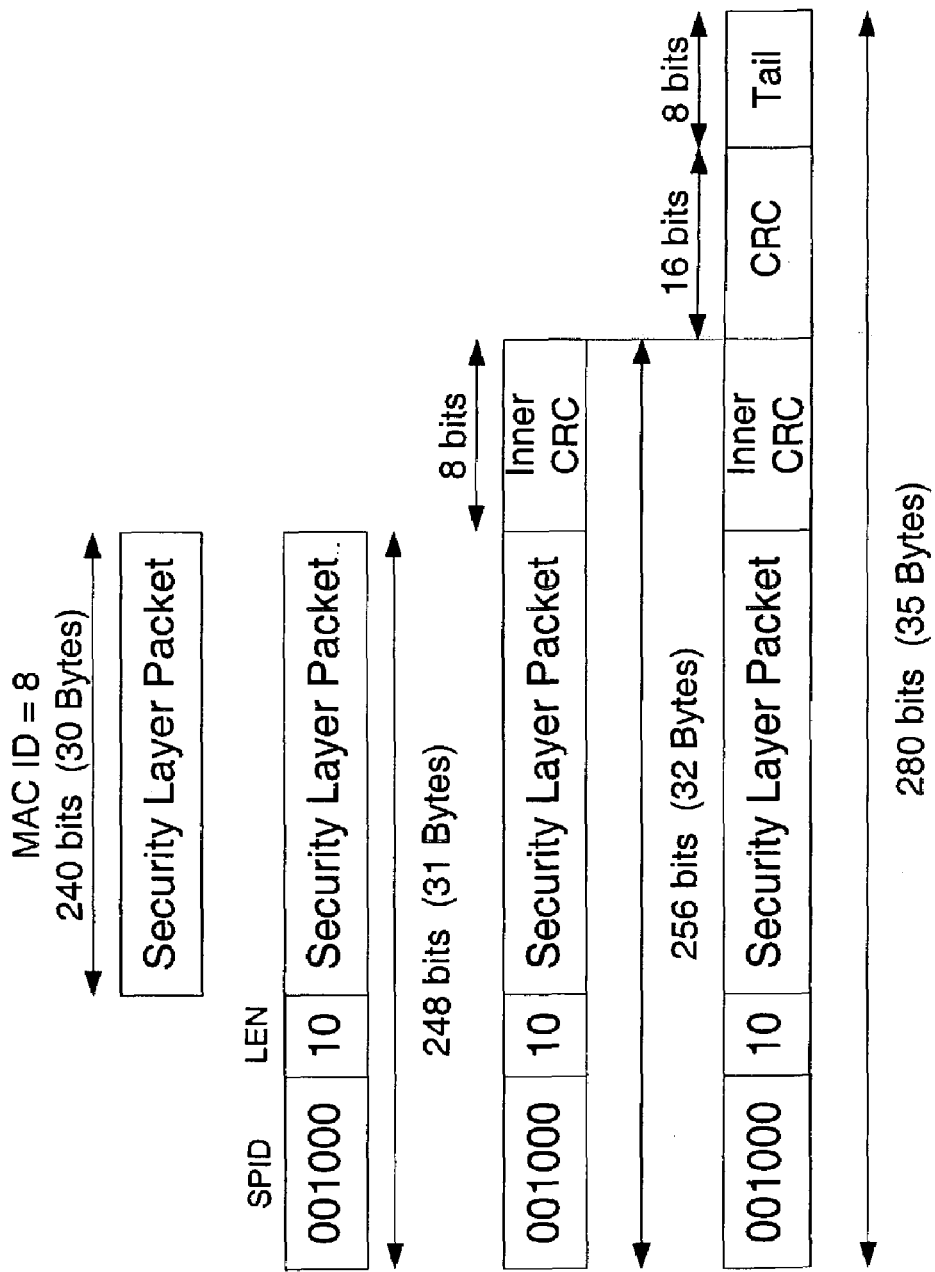
FIG. 12 illustrates generation of a physical layer packet based on a short security layer packet.
Figure 13:
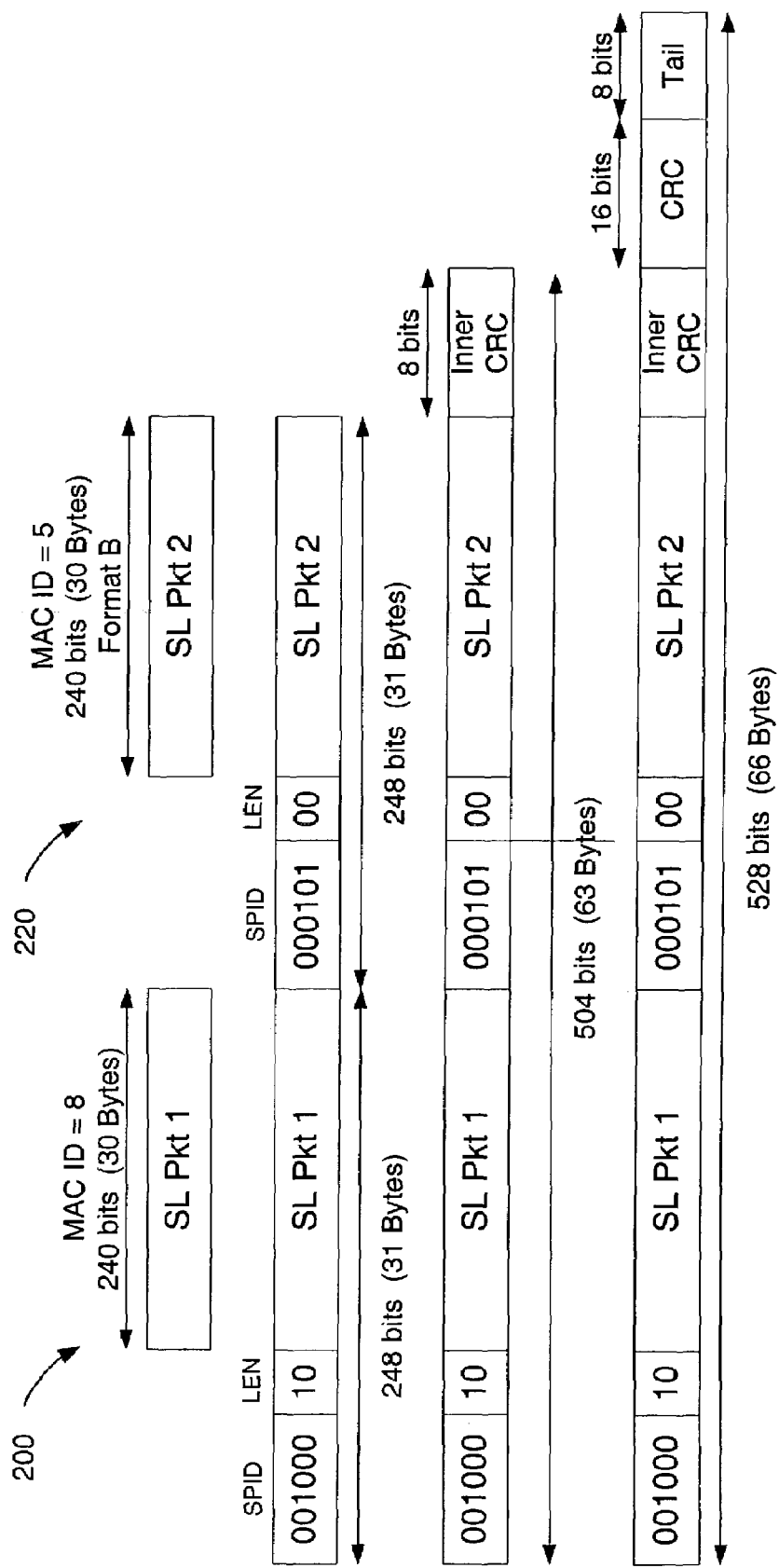
FIG. 13 illustrates generation of a 512-bit multiplexed physical layer packet containing payloads for two users.
Figure 14:
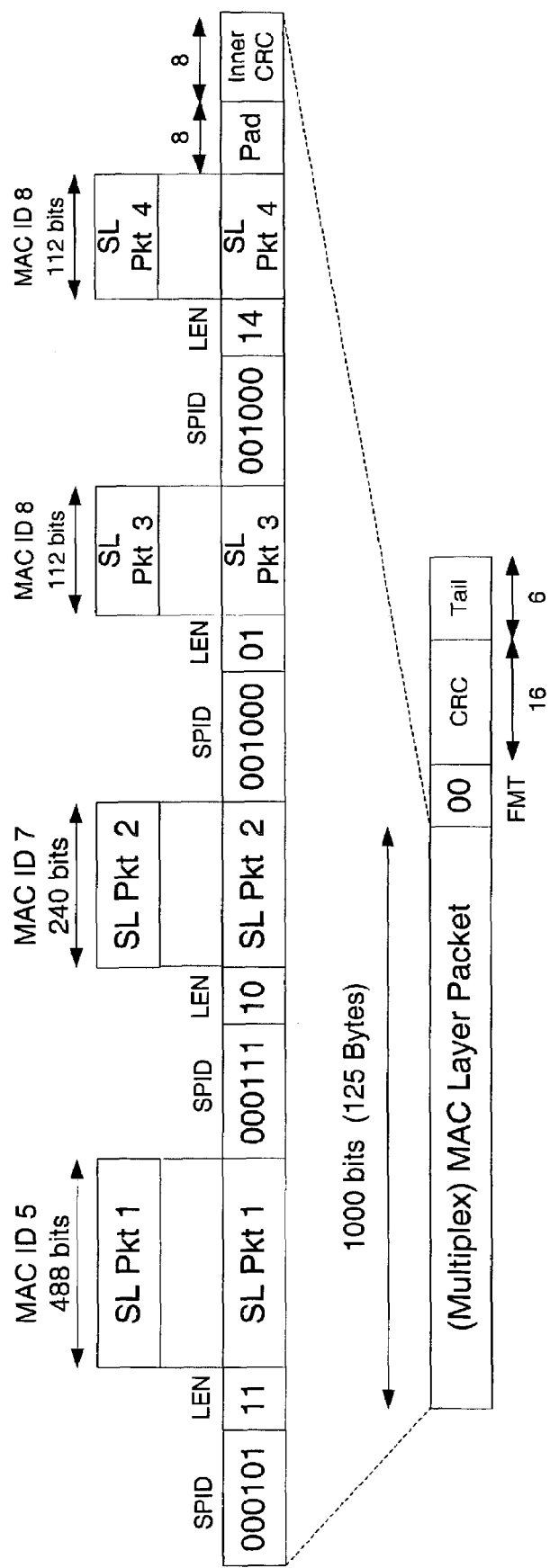
FIG. 14 is a multiplex physical layer packet including different length security layer packets.
Figure 18:
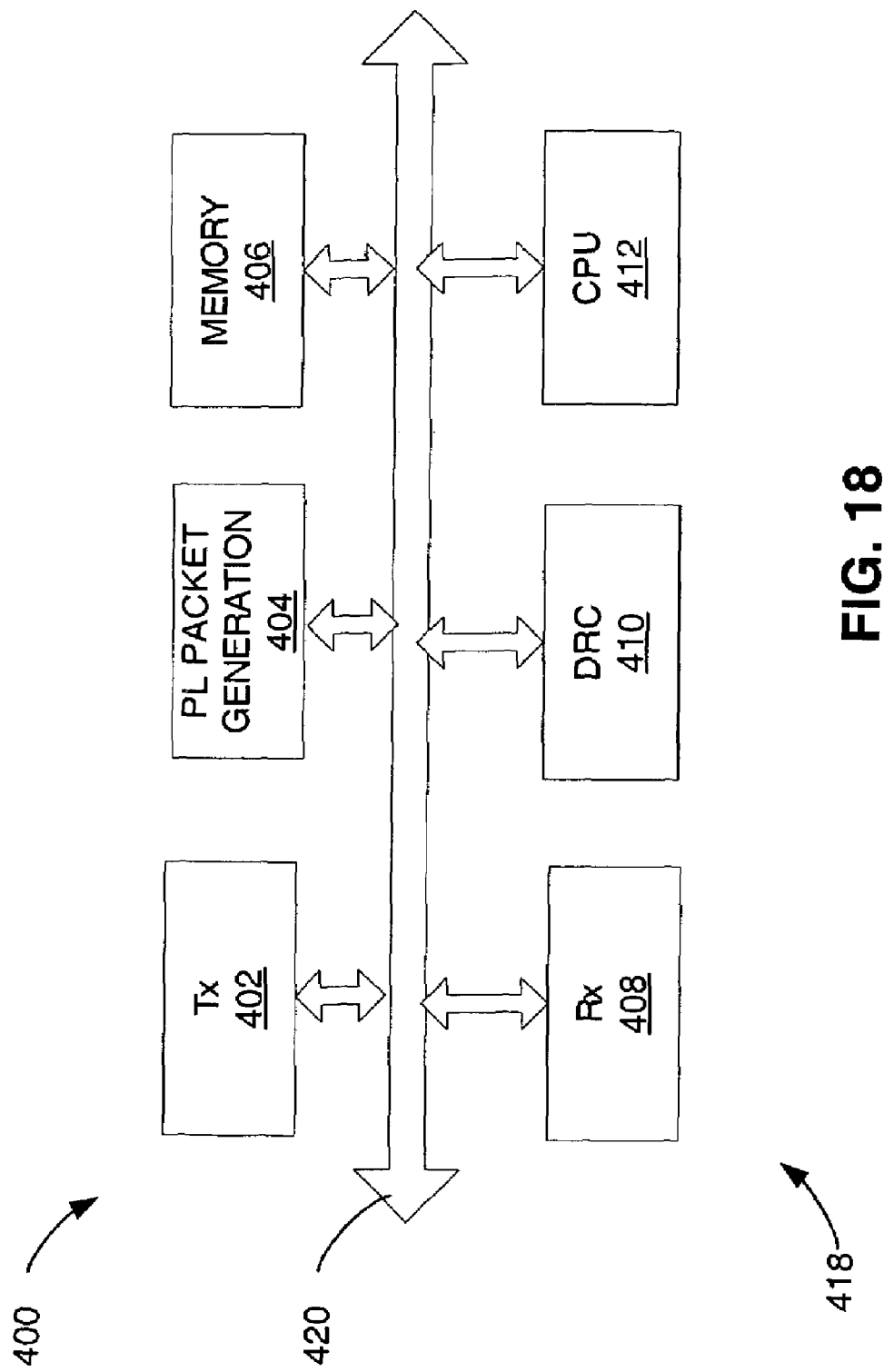
FIG. 18 is an access network according to one embodiment.
Figure 19:
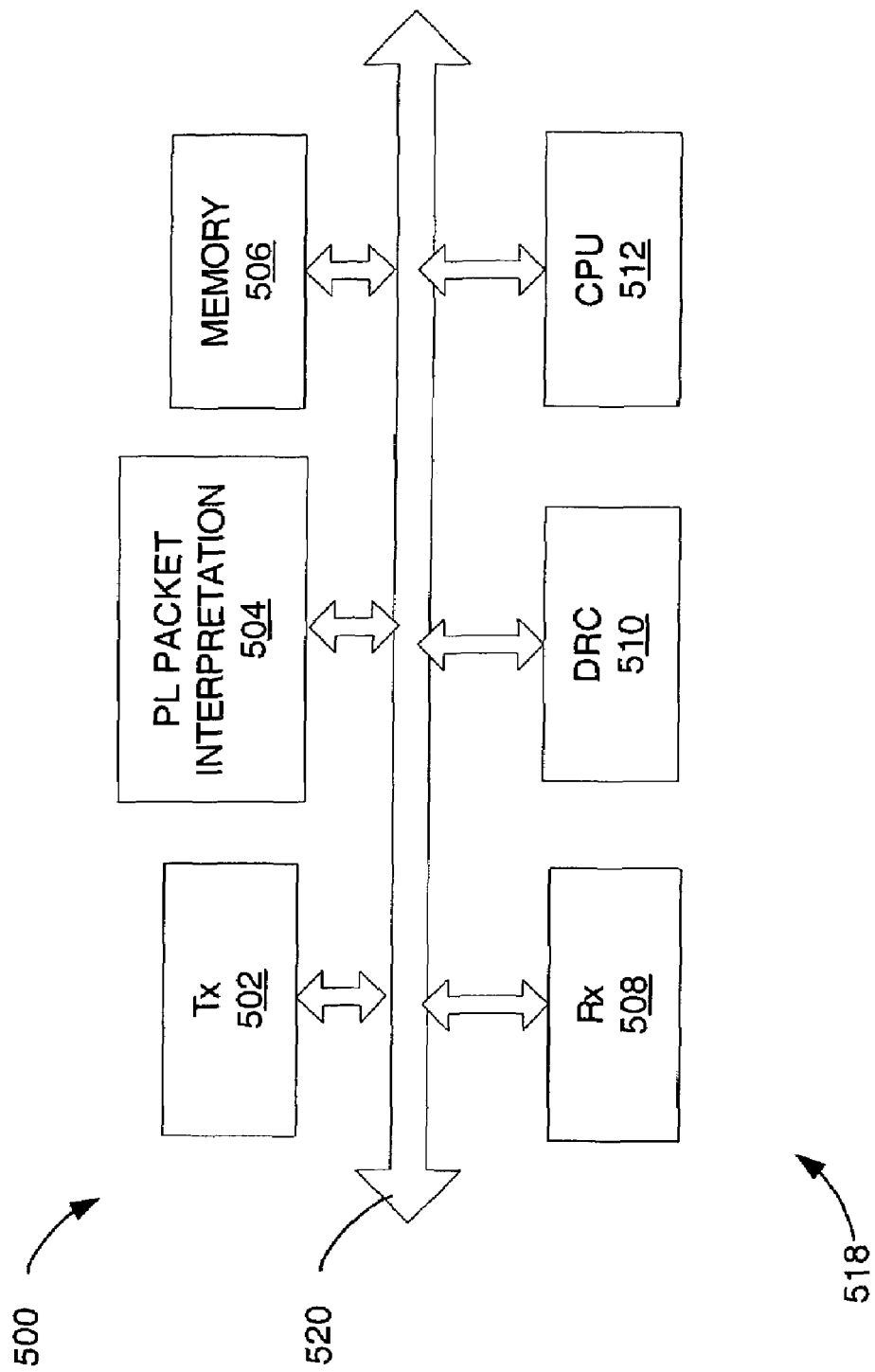
FIG. 19 is an access terminal according to one embodiment.

Referring again to the packet construction procedures described hereinabove, in a first example of packet encapsulation illustrated in FIG. 12, the SL packet is 240 bits. The SL packet is a Format A packet, the target PL packet is 280 bits, and the MAC ID=8. The SL packet is processed by adding two fields: SPID and LEN, as described hereinabove. The LEN field is 2 bits and the SPID field is 6 bits, resulting in a modified packet of 248 bits. An Inner CRC (8 bits) is appended, and in addition a 16-bit CRC plus an 8-bit tail are added resulting in a 280 PL packet. In a second example, illustrated in FIG. 13, two 240-bit SL packets are multiplexed to form a 528-bit PL packet. A first SL packet 200 is 240 bits and has a MAC IID =8. The SL packet 200 is a Format A packet for a first user. The SL packet 220 is a Format B packet for a second user. The SL packet 220 is also 240 bits, but has a MAC ID =5. The multiplexed packet then includes an SPID and LEN for each of packets 200 and 220. An inner CRC (8 bits), a CRC (16 bits), and a tail (8 bits) are added to the multiplexed packet resulting in a PL packet of 528 bits. In a third example, four same format packets, e.g., Format A packets, each for different users, are multiplexed into a 1024-bit PL packet as illustrated in FIG. 14. Each SL packet has a corresponding MAC ID value. The SL packets are of various lengths, including a first SL packet of 488 bits, a second SL packet of 240 bits, and two SL packets of 112 bits. A SPID and LEN are applied to each SL packet to form a multiplexed packet. An inner CRC, CRC and Tail are then applied to the multiplexed packet to form a PL packet. In this example, a format field, FMT, is also included. As indicated in Table 1 given hereinabove, the FMT value identifies the PL packet as a multiplexed packet. In a fourth example, illustrated in FIG. 15, different format packets, e.g., Format A and Format B packets, are multiplexed to form a 2048-bit PL packet. A first SL packet has 1000 bits, wherein the second and third SL packets are 488 bits each. The first SL packet 300 is used to generate a first capsule, and the second and third packets 320, 340 are used to generate a second capsule. The SL packet 300 is 1000 bits and therefore may compose a single capsule. The SL packets 320, 340 are less than 1000 bits and are therefore one capsule includes both packets. As illustrated, a FMT and capsule address is applied to the first SL packet 300 to form a first capsule. The second capsule is a multiplexed capsule including the SL packets 320, 340. To each of the SL packets 320, 340 are added an SPID and LEN. A second capsule address is then provided for the second capsule. The second capsule address is cleared indicating that data for multiple recipients are included in the capsule. The two capsules are then concatenated and a pad, CRC, and tail appended to form a 2048-bit PL packet. FIG. 18 illustrates a wireless infrastructure element 400, including transmit circuitry (Tx) 402, and receive circuitry (Rx) 418 coupled to a communication bus 420. A DRC unit 410 receives the DRC data rate request as received on the DRC channel from ATs. The element 400 further includes a Central Processing Unit (CPU) 412 and a memory 406. The PL packet generation 404 receives the DRC data rate request from DRC unit 410 and composes the PL packet. The PL packet generation 404 may generate a simplex packet or a multiplex packet, and further may implement any of the methods described hereinabove. FIG. 19 illustrates an AT 500 according to one embodiment. The AT 500 includes transmit circuitry (Tx) 502, and receive circuitry (Rx) 518 coupled to a communication bus 520. A DRC unit 510 determines the maximum data rate and transmits the corresponding request on the DRC channel from ATs. The element 500 further includes a Central Processing Unit (CPU) 512 and a memory 506. The PL packet interpretation 504 receives the PL packet for the AN and determines if any content is directed to AT 500. Further the PL packet interpretation 504 determines the transmission rate of the received PL packet. The PL packet interpretation 504 may process a simplex packet or a multiplex packet, and further may implement any of the methods described hereinabove.

As described hereinabove, methods and apparatus are providing multi-user packets on a forward link in order to improve packing efficiency. In one embodiment, shorter packets are provided to users either in poor channel conditions or users that require smaller amounts of data due to the applications and the corresponding Quality of Service (QoS) requirements. In another embodiment, a mechanism for supporting multi-user packets in the context of 1 xEV-DO system provides for a modified Preamble structure (Unicast v/s multi-user packets), a modified Rate Set, and/or a modified mechanism for identifying ACK from a single-user packet or a multiplexed packet (delayed ACK). ON/OFF keying for ACK channel v/s bi-polar keying used in IS-856, and/or a multi-valued interpretation of DRC Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for an access terminal, comprising:
   receiving a multi-user Physical Layer (PL) data packet including a sub-packet, the multi-user PL data packet comprising data addressed to at least two access terminals;
   attempting to decode the PL data packet with a set of data transmission rates;
   if the decode is successful, extracting a sub-packet identifier;
   determining if the sub-packet is directed to the access terminal;
   processing the sub-packet if directed to the access terminal; and
   extracting a capsule address indicating a destination of at least one capsule in the PL data packet, wherein the capsule address is included in a capsule address field, wherein a designated capsule address indicates a multi-user PL data packet.

2. The method as in claim 1, further comprising: extracting a length value indicating a bit length of a Medium Access Control (MAC) data packet corresponding to the PL data packet.

3. The method as in claim 2, wherein the length value identifies a format of the PL data packet.

4. The method as in claim 1, further comprising:
   sending a data rate request to an access network based on a forward channel condition between the access terminal and the access network, the data rate request specifying one or more data rates for the access network to transmit data to the access terminal.

5. The method as in claim 1, wherein attempting to decode the multi-user PL data packet uses codes associated with code division multiple access (CDMA).

6. The method as in claim 1, further comprising:
   sending an acknowledge indicator if the sub-packet contained in the PL packet is directed to the access terminal and the access terminal correctly decoded the PL packet.

7. An access terminal comprising:
   a control processor for executing computer-readable instructions;
   a memory storage device for storing computer-readable instructions;
   a receiver to receive a multi-user Physical Layer (PL) data packet including a sub-packet, the multi-user PL data packet comprising data addressed to at least two access terminals and
   a Physical Layer (PL) packet interpretation unit adapted to:
      attempt to decode the PL data packet with a set of data transmission rates;
      if the decode is successful, determine if the sub-packet is directed to the access terminal;
      process the sub-packet if directed to the access terminal; and
      extract a capsule address indicating a destination of at least one capsule in the PL data packet, wherein the capsule address is included in a capsule address field, wherein a designated capsule address indicates a multi-user PL data packet.

8. An access terminal, comprising:
   means for receiving a multi-user Physical Layer (PL) data packet including a sub-packet, the multi-user PL data packet comprising data addressed to at least two access terminals;
   means for attempting to decode the PL data packet with a set of data transmission rates;
   means for extracting a sub-packet identifier from the PL data packet if the decode is successful;
   means for determining if the sub-packet is directed to the access terminal;
   means for processing the sub-packet if directed to the access terminal; and
   means for extracting a capsule address indicating a destination of at least one capsule in the PL data packet, wherein the capsule address is included in a capsule address field,
wherein a designated capsule address indicates a multi-user PL data packet.

9. An access network apparatus comprising:
   a data rate control (DRC) unit to receive data rate requests from a plurality of access terminals, each data rate request specifying at least one rate that an access terminal requests the access network apparatus to transmit data to the access terminal;
   a physical layer (PL) packet generation unit adapted to receive the data rate requests from the DRC unit, based on the data rate requests, select at least two access terminals to receive data from a multi-user PL packet, select a length from a set of lengths for the multi-user PL packet, select a transmission rate from a set of transmission rates to transmit the multi-user PL packet, and generate the selected length multi-user PL packet; and
   a transmitter to transmit the multi-user PL packet to the access terminals.

10. The AN apparatus as in claim 9, wherein the PL packet generation unit is adapted to:
   generate a variable length security layer (SL) packet.

11. The AN apparatus as in claim 10, wherein the PL packet generation unit is adapted to:
   combine a plurality of SL packets into one PL packet.

12. The AN apparatus as in claim 9, wherein the AN apparatus is adapted to:
   retransmit the variable length PL packet after a first number of time slots, wherein the AN apparatus waits sufficient time slots to allow an access terminal to acknowledge receipt.

13. The AN apparatus as in claim 12, wherein the first number of time slots is four.

14. The AN apparatus as in claim 9, wherein the PL packet generation unit generates the variable length PL packet as a function of a channel condition between the access terminals and the access network apparatus.

15. The AN apparatus as in claim 9, wherein the PL packet generation unit is adapted to:
   generate a capsule comprising a plurality of security layer (SL) packets directed to multiple access terminals (ATs).

16. The AN apparatus as in claim 15, wherein the PL packet generation unit is adapted to:
   generate a plurality of capsules, wherein each capsule has a corresponding capsule address.

17. A method for processing data packets in a wireless communication system, comprising:
   receiving a plurality of connection layer packets for transmission to a plurality of users;
   based on data rate requests received from the users, concatenating a first connection layer packet destined for a first user to a second connection layer packet destined for a second user to form a physical layer packet;
   selecting a length from a set of lengths for the physical layer packet;
   selecting a transmission rate from a set of transmission rates to transmit the physical layer packet; and
   transmitting the first and second packets in the physical layer packet.

18. A method for processing data packets in a wireless communication system, comprising:
   determining a first channel condition between an access network and a first access terminal;
   determining a second channel condition between the access network and a second access terminal;
   receiving a first block of data for transmission to a first access terminal;
   receiving a second block of data for transmission to a second access terminal;
   selecting a first security layer packet length from a set of lengths based on a length of the first block of data and the determined first channel condition;
   generating a first security layer packet having the first security packet layer length;
   selecting a second security layer packet length from the set of lengths based on the length of the second block of data and the determined second channel condition;
   generating a second security layer packet having the second security packet layer length; and
   generating a physical layer packet with the first and second security layer packets.

19. The method as in claim 18, wherein the wireless communication system has a default security layer packet length in bits, and the first selected security packet layer length is smaller than the default security layer packet length.

20. The method as in claim 18, further comprises transmitting the physical layer packet with code division multiple access (CDMA) techniques.

21. The method as in claim 18, wherein selecting the first security layer packet length comprises:
   determining a Quality of Service (QoS) requirement; and
   determining a security layer packet length as a function of the first channel condition and the QoS requirement.

* * * * *